(12) United States Patent
Shan et al.

(10) Patent No.: US 9,242,418 B2
(45) Date of Patent: Jan. 26, 2016

(54) OPHTHALMIC LENS CONTAINING A FRESNEL SURFACE AND METHOD FOR MANUFACTURING SAME

(75) Inventors: Haifeng Shan, Shrewsbury, MA (US); Marvin Pounders, St. Petersburg, FL (US); Richard Muisener, Tarpon Springs, FL (US); Bill Houle, Clarksburg, WV (US); Zeming Gou, Pearisburg, VA (US)

(73) Assignee: Essilor International, Charenton-le-Pont (FR)

( * ) Notice: Subject to any disclaimer, the term of this patent is extended or adjusted under 35 U.S.C. 154(b) by 169 days.

(21) Appl. No.: 13/297,667

(22) Filed: Nov. 16, 2011

(65) Prior Publication Data

US 2013/0120707 A1    May 16, 2013

(51) Int. Cl.

| | |
|---|---|
| *B29D 11/00* | (2006.01) |
| *B29C 45/16* | (2006.01) |
| *B29C 33/38* | (2006.01) |
| *B29L 11/00* | (2006.01) |
| *B29C 45/37* | (2006.01) |
| *B29K 21/00* | (2006.01) |
| *B29K 33/00* | (2006.01) |
| *B29K 75/00* | (2006.01) |

(52) U.S. Cl.
CPC ...... *B29D 11/00269* (2013.01); *B29C 33/3828* (2013.01); *B29C 45/16* (2013.01); *B29D 11/0073* (2013.01); *B29C 45/372* (2013.01); *B29K 2021/003* (2013.01); *B29K 2033/12* (2013.01); *B29K 2075/00* (2013.01); *B29K 2995/0013* (2013.01); *B29L 2011/005* (2013.01)

(58) Field of Classification Search
CPC ............... B29D 11/00269; B29D 11/0073; B29C 45/16; B29C 45/372; B29C 33/3828; B29K 2995/0013; B29K 2021/003; B29K 2033/12; B29K 2075/00; B29L 2011/005
USPC ............... 264/1.1, 1.7, 2.5, 2.2, 255, 328.8; 425/542, 808
See application file for complete search history.

(56) References Cited

U.S. PATENT DOCUMENTS

| | | | |
|---|---|---|---|
| 4,146,306 A | | 3/1979 | Wallach |
| 5,523,030 A | * | 6/1996 | Kingsbury ............... 264/1.7 |
| 5,840,352 A | * | 11/1998 | Shimizu et al. ......... 425/556 |
| 6,367,930 B1 | | 4/2002 | Santelices et al. |
| 2003/0075814 A1 | * | 4/2003 | Keller et al. ............. 264/1.32 |

FOREIGN PATENT DOCUMENTS

WO       2005/042225 A2    5/2005

* cited by examiner

*Primary Examiner* — Mathieu Vargot
(74) *Attorney, Agent, or Firm* — Gardere Wynne Sewell LLP (57) ABSTRACT

A process is described for manufacturing an ophthalmic lens containing a Fresnel microstructured surface inside the lens. The Fresnel lens is injection molded with a mold insert having a heat conductivity lower than the thermoplastic material used to form the Fresnel lens. A second thermoplastic material is overmolded to the Fresnel lens to cover and protect the microstructured surface. The mold insert is made from nickel or a thermoplastic material. The resulting lens includes two layers having different refractive indices. The Fresnel lens may be made from polycarbonate while the overmold may be made from a poly(methyl methacrylate) or a thermoplastic polyurethane.

20 Claims, 9 Drawing Sheets

OPHTHALMIC LENS CONTAINING A FRESNEL SURFACE AND METHOD FOR MANUFACTURING SAME

BACKGROUND OF THE INVENTION

1. Field of the Invention

The invention relates to an ophthalmic lens containing a Fresnel surface and a method for manufacturing same.

2. The Prior Art

Lenses and other articles manufactured at optical quality, have exacting demands for mold replication, high optical transmission and impact resistance. Injection molding of lenses requires edge gating so that the runner ends up remote from the lens surfaces. The paths from the gate to the edge points of the mold cavity are not symmetrical and therefore make it difficult to control the thermodynamics of the cooling melt flow. As lens cavities become thinner, straight injection molding techniques are unable to fill the mold without premature freeze-off. Accordingly, injection molding machines have been modified to enlarge the cavity during some phase of the injection cycle, in a so-called injection/compression process.

For ophthalmic lenses, plastic materials represent a safer, thinner and lightweight alternative. As the demand for thinner and lighter lenses increases, there is a greater need for materials and optical designs that have a higher index of refraction and better performance.

Microstructured surfaces can impart certain functionality to an ophthalmic lens. For example, an ophthalmic lens containing a Fresnel microstructure can be made thinner and lighter, than a non-structured lens with same power.

As described above, thin lenses cannot be made with conventional injection molding, because of issues relating to mold replication. Similarly, microstructured surfaces which are more challenging, cannot be replicated completely and precisely using a structured metal insert in an injection molding process.

One proposal to make a microstructured surface described in U.S. Pat. No. 4,146,306 uses thin sheets of plastic material such as cellulose acetate, Tenite, Vinylite, polystryrene or methyl methacrylate. The ridges which form the microstructured surface are made by engraving concentric grooves or by making a matrix, or mold, in the desired shape. Where the parts are molded separately, they can then be either cohesively or adhesively bound together by the application of a suitable translucent adhesive, or cement, as is known in the optical art. Another method of manufacture would be to mold the first layer with the ridges and then to place such layer in another mold and pour the molten material into the mold cavity. The proposed methods are costly in that they involve multiple steps such as forming the films, engraving complementary ridges and grooves in two or more different films, and then adhering the various films together.

Figure 1A:
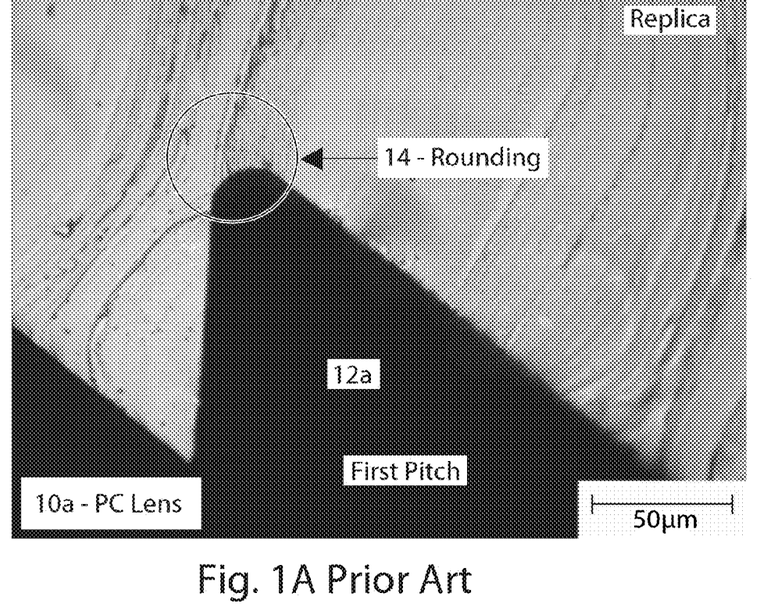
FIG. 1A is micrograph of a first pitch of a Fresnel lens made according to the prior art injection molding process.

Injection molding, which has a fixed mold temperature below a material's glass transition temperature ($T_g$), can't replicate surface microstructure with high fidelity. FIG. 1A shows a rounded ridge of a Fresnel microstructure. In other words, the molten resin freezes off thereby forming a rounded tip before it reaches the corner of the ridge. The microstructure mold has increased surface area compared to a smooth mold surface. Since the mold temperature is lower than the $T_g$, the resin is subject to solidification as it rolls along the mold microstructure surface. In the corner of the ridge, the resin is rolling along two surfaces that are converging at the corner of the ridge. The rolling action causes the resin to cool to a rounded shape before it reaches the sharp corner, as can be seen in FIG. 1A. Because of process limitation, thermodynamic considerations and polymer overheating, the resin cannot be heated sufficiently to reach the corner and still produce a lens with acceptable optical qualities.

Figure 1B:
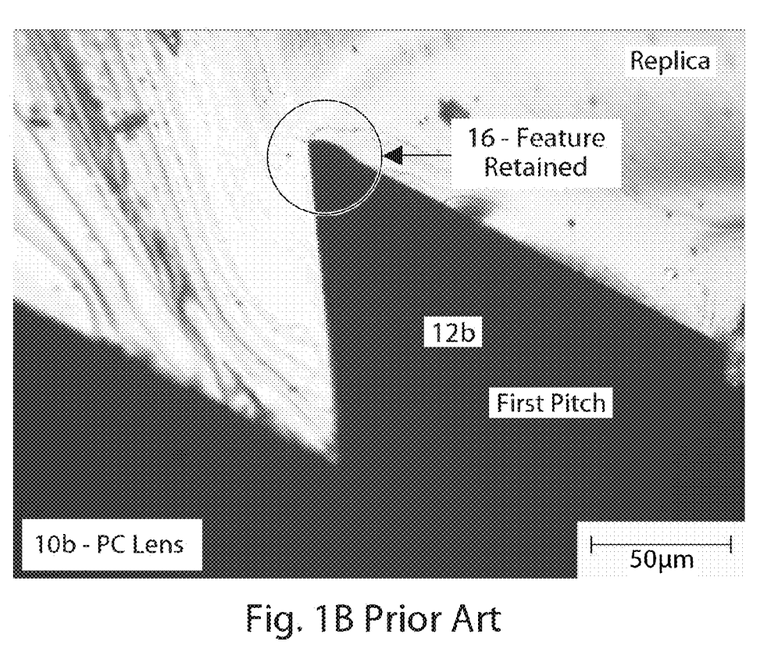
FIG. 1B is a micrograph of a first pitch of a Fresnel lens made according to the prior art injection-embossing molding process.

Injection-Embossing molding, which inject melt into mold at the temperature above material's $T_g$, and eject the part at the temperature below the $T_g$, can replicate microstructure with high fidelity. FIG. 1B shows a well replicated Fresnel microstructure.

The Injection-Embossing molding technique has successfully molded polycarbonate Fresnel lens with high structure replication quality. However, compared to injection molding, it has a longer cycle time (15 minutes for current processing condition). Also, it needs a specific thermolator, with both heating and cooling functions, to change mold temperature. More particularly, some molds are equipped with thermal control channels that circulate fluid through the mold near the mold inserts. A thermolator is a device which can quickly alternate between heated fluid and cooling fluid. During the injection molding cycle, heated fluid is circulated to raise the temperature of the mold inserts, e.g. above the $T_g$, to allow the resin to flow longer and completely fill the mold. Then the cooling fluid is circulated to solidify the resin by bringing it below its $T_g$.

Furthermore, the Injection-Embossing molding technique has been successfully applied to polycarbonate (PC) and poly (methyl methacrylate) (PMMA). However, it does not address problem associated with molding materials having a $T_g$ below room temperature, such as thermoplastic polyurethane (TPU) and ethylene/methacrylic acid (E/MAA) copolymer.

Additional methods have been proposed to incorporate functional layers in lenses. For example, U.S. Pat. No. 6,367,930 discloses a multi-ply approach where a photochromic layer is inserted in to a mold in a so-called film insert molding method. In an alternate embodiment, polycarbonate is injected in to a mold, followed by a photochromic TPU in a so-called over-mold process. The patent does not mention the incorporation of a Fresnel lens in to a lens.

Accordingly, there is a need for an ophthalmic lens containing a Fresnel lens, with all of its intrinsic properties and additionally a surface layer containing a microstructure with high fidelity.

SUMMARY OF THE INVENTION

Therefore, it is an object of an embodiment of the present invention to provide an ophthalmic lens containing a Fresnel surface.

It is a further object according to another embodiment to provide methods for manufacturing an ophthalmic lens containing a Fresnel surface.

It is another object to provide a low heat conductivity mold insert to prevent heat dissipation during molding, and thus help material flow. By controlling thermodynamics through the heat conductivity of the mold insert, the need for a thermolator to provide a heat-cool cycle is no longer needed.

It is a further object to configure an injection molding process to manufacture a Fresnel lens with high fidelity microstructure replication.

It is another object to form a polycarbonate Fresnel lens and injection mold a protective thermoplastic polymer directly over the structured surface.

It is a further object to provide a coating layer on the Fresnel surface which will be permanently adhered to thereto.

It is another object to provide a coating layer with a different refractive index than the Fresnel lens.

It is a further object to provide a coating layer with a heat conductivity that is lower than the heat conductivity of the Fresnel lens.

These and other related objects are achieved according to a first embodiment of the invention regarding a process for manufacturing an ophthalmic lens containing a Fresnel surface inside the lens. In an initial step, a first thermoplastic material is injection molded with a microstructured mold insert to provide a first microstructured lens having a Fresnel surface. Subsequently, a second thermoplastic material is overmolded which is different than the first thermoplastic material on to said first lens to provide the ophthalmic lens.

The microstructured mold insert has a heat conductivity that is lower than the heat conductivity of the first thermoplastic material. The microstructured mold insert is a hybrid mold insert comprising a Nickel microstructured shim bonded to a ceramic pillar. Alternatively, the microstructured mold insert is a plastic mold insert removably mounted on a support pillar, wherein the plastic is a further thermoplastic material which avoids adherence to the first thermoplastic material.

The second thermoplastic material has a heat conductivity that is lower than the heat conductivity of the first thermoplastic material. The second thermoplastic material demonstrates strong adhesion to the first thermoplastic material. The first thermoplastic material comprises polycarbonate. The second thermoplastic material is poly(methyl methacrylate) (PMMA) or thermoplastic urethane (TPU).

The overmolding step further includes placing the first microstructured lens in to an injection molding machine and overmolding the second thermoplastic material into an intimate bond with the first microstructured lens. The ophthalmic lens comprises a first thermoplastic material with a first refractive index and a second thermoplastic material having a second refractive index different from the first refractive index.

According to a further embodiment of the invention, an ophthalmic lens is manufactured according to the manufacturing process. An apparatus according to an embodiment of the invention includes an ophthalmic lens containing a Fresnel surface inside the lens. The lens includes a Fresnel lens having a microstructured surface made from a first thermoplastic material in combination with an overmold coating. The coating is made from a second thermoplastic material intimately bonded to the microstructured surface. The second thermoplastic material has a heat conductivity that is lower than the heat conductivity of the first thermoplastic material. The first thermoplastic material has a different refractive index than the second thermoplastic material. The first thermoplastic material is polycarbonate. The second thermoplastic material is poly(methyl methacrylate) (PMMA) or thermoplastic urethane (TPU).

According to another embodiment, there is provided a system for manufacturing an ophthalmic lens containing a Fresnel surface inside the lens. The system includes an injection molding machine containing a microstructured mold insert in combination with two thermoplastic articles. A first thermoplastic lens has a Fresnel surface molded by contact with the microstructured mold insert. A second thermoplastic overmold layer is intimately bonded to the Fresnel surface. The first thermoplastic lens has a heat conductivity higher than the mold insert and the second thermoplastic overmold layer, low adhesion to the mold insert, and high adhesion to the second thermoplastic overmold layer.

The first thermoplastic material is polycarbonate. The second thermoplastic material is poly(methyl methacrylate) (PMMA) or thermoplastic urethane (TPU). The microstructured mold insert is made from Nickel mounted on a support pillar made from ceramic. Alternatively, the microstructured mold insert is made from a thermoplastic material mounted on a support pillar made from metal.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENTS

There has been a long-standing need to be able to replicate a Fresnel lens structure with high fidelity using an industrial process and meeting industry pricing. To obtain a high level of replication, it was determined that better control on the heat conductivity parameter of the material used as injected material and the material used for the mold insert was needed. Accordingly, the present invention describes two systems that allow a Fresnel lens or Fresnel surface to be manufactured by an injection molding process. The first system is referred to as a hybrid mold insert system and the second is referred to as a plastic mold insert system. The first system and the second system are different because they don't comprise same materials, but they exhibited the same key property relating to the relationship of heat conductivity of materials used in each system.

Hybrid Mold Insert System

In the hybrid mold insert system, a mold insert made from two materials is used instead of a metal mold insert to replicate microstructure during injection molding processing. The hybrid mold insert consist of two layers. The surface layer is made of a thin Nickel structured shim (1~2 mm), and bonded to the bottom layer, a pillar or block (around 40 mm) having a cylindrical shape as shown in cross-section in FIG. 2. The Nickel structured shim can be made either by machining with a precision diamond lathe or by replication on a structured template with an electroforming process.

The principle is: compared to metal, some ceramics have much lower thermal conductivity, due to its ionic-covalent bonding, which does not form free electrons. For example, for a ceramic composed of $SiO_2$ (59%) and $Al_2O_3$ (29%), its thermal conductivity is 0.06 W/m*K, while Nickel's is 91 W/m*K and stainless steel's is 16 W/m*K. So, for a Nickel/ceramic hybrid insert, its overall heat conduction will be much lower than similar stainless mold insert. During injection molding, it will take longer time to cool the material from its molten state to solidified state. The material will thus have enough time to flow into microstructure tips before it solidify, thus avoiding the problem illustrated in FIG. 1A. The final molded lens will have microstructure with high fidelity.

For better heat insulation, the Nickel shim should be made as thin as possible, while still maintaining certain mechanical strength. The ceramic block should be thick enough, to prevent heat from being dissipated too quickly. In a practical embodiment, a hybrid mold insert was constructed with a diameter of 76 mm. The Nickel shim structure had an maximum height of between 1-2 mm. The ceramic block had a nominal height of about 40 mm.

Plastic Mold Insert System

An alternate embodiment utilizes a plastic mold insert, instead of a metal mold insert, to replicate microstructure during conventional injection molding.

The principle behind this innovation is that plastic has a much lower heat conductivity than metal. For example, polycarbonate's heat conductivity is 0.2 W/mK, while Nickel's is 91 W/mk. So, if a polycarbonate insert is used, the material's heat will be dissipated much slower than with Nickel insert. It thus will take longer time to cool the material from its molten state to solidified state, During such long time, the material will have enough time to flow into microstructure tips before it cools down and solidify. This will result in a lens with high fidelity structure replication.

Figure 3A:
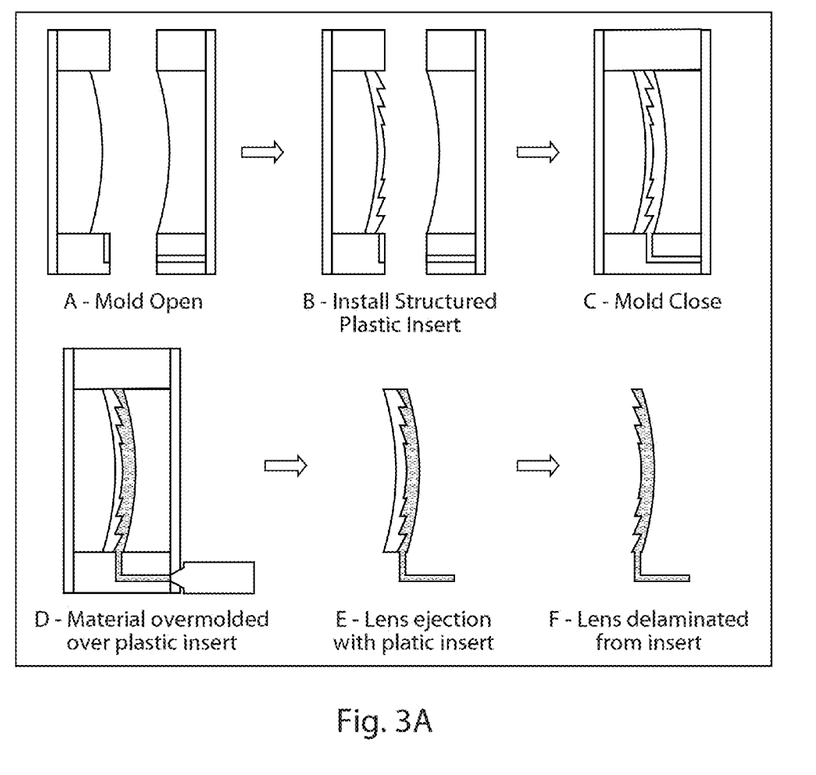
FIG. 3A is a diagram showing various steps of a replication process according to an embodiment of the invention.

The process using the plastic mold insert system is schematically illustrated in FIG. 3A. The process utilizes an injection molding machine with a plastic mold insert that thermally insulates the molten resin from the underlying metal insert. The process includes the following steps:

In step A the mold is opened to begin the cycle.

In step B, the plastic mold insert is placed into the mold cavity, with structured surface facing the cavity.

In step C: The mold block then closes,

In step D: the polymer melt is injection molded into mold cavity.

In step E: After being packed and cooled for certain time, the lens is ejected with plastic mold insert.

In step F: The lens is demolded from the insert.

When compared to an Injection-Embossing molding process, this invention has the following advantages:

Injection molding according to the invention provides a shorter cycle time. With hybrid or plastic insert, the microstructure lens can be molded at fixed mold temperature, which is below material's glass transition temperature. General cycle time is around 4 minutes. While Injection-Embossing molding has to adjust the mold temperature above material's glass transition temperature before injection, and lower the mold temperature below material's glass transition temperature after injection. General cycle time is around 15 minutes.

The injection molding process delivers the capability to mold lenses from soft materials with high fidelity. Due to its low glass transition temperature, soft materials could not be molded with high fidelity microstructure replication, by Injection-Embossing molding. With hybrid or plastic insert, soft microstructure lens, which is made of material with glass transition temperature below room temperature, can be molded.

The injection molding process is less expensive. Injection-Embossing molding has to mold a lens above its glass transition temperature, which requires more energy to heat the mold. The hybrid insert molding can mold a lens below its glass transition temperature, which thus reduces energy consumption. For example, to mold a PC lens, the mold temperature has to be at least 330° F. for Injection-Embossing molding, while hybrid insert molding only requires a mold temperature of 270° F.

The injection molding provides an easy, fast industrial process that facilitates mass production of plastic insert. Injection-Embossing molding uses the metal mold insert, which is more expensive and requires much longer manufacturing time.

Hybrid Mold Insert System Experiment

In a practical experiment utilizing the hybrid mold insert system, a hybrid mold insert was made with the process as described above. The ceramic block was made from a general purpose alumina silicate ceramics (Part #: 8479K999A and 8479K999B), supplied by McMaster Carr Supply Company. Some information about the material is listed in Table 1. The material is a good temperature insulator and its thermal conductivity is 0.06 W/m*K. The structured Nickel shim, was made with electroforming process. The Nickle shim was bonded to the ceramic block, using well known gluing process wherein the adhesive is an epoxy adhesive.

TABLE 1

| General Purpose Alumina Silicate Ceramics Properties | | | | |
|---|---|---|---|---|
| Chemical Composition | 29.2% $Al_2O_3$ + 59% $SiO_2$ + 2.97% $Fe_2O_3$ + 1.43% $TiO_2$ + 1.17% $K_2O$ + trace element | | | |
| | Nominal Density | Flexural Strength | Tensile Strength | Rockwell Hardness |
| Mechanical Properties | $2.49 \times 10^3$ kg/m$^3$ | 68.9 MPa | 17.2 MPa | 59 (H scale) |
| | Thermal Conductivity | Thermal Expansion Coefficient | Max. Temperature | Color |
| Physical Properties | 0.06 W/m*k | $36 \times 10^{-9}$ m | 2012° F. | Opaque, light gray |

The hybrid insert was placed into a two-cavity mold block. A Nickel metal insert with same Fresnel microstructure design was tested at the same time.

Materials

Ophthalmic grade polycarbonate was used. Some properties are listed in Table 2.

TABLE 2

Properties of raw materials tested in this Study

| | PC |
|---|---|
| Grade | Lexan RL7220 |
| Refractive Index | 1.59 |
| $T_g$ (° C./° F.) | 146/295 |

Processing

The Fresnel lens was made by injection molding process at different processing conditions. (Table 3). Two major processing parameters, melt temperature and mold temperature, were tested.

TABLE 3

| Processing condition Parameters | |
|---|---|
| Melt Temperature (° F.) | 570, 590 |
| Injection Speed (mm/s) | 25 |
| Holding Pressure (bar) | Multi steps from 1000 to 700 bar |
| Holding Time (s) | 8 |
| Cooling Time (s) | 150 |
| Mold Temperature (° F.) | 260, 270, 280, 290, 300 |

Figure 3B:
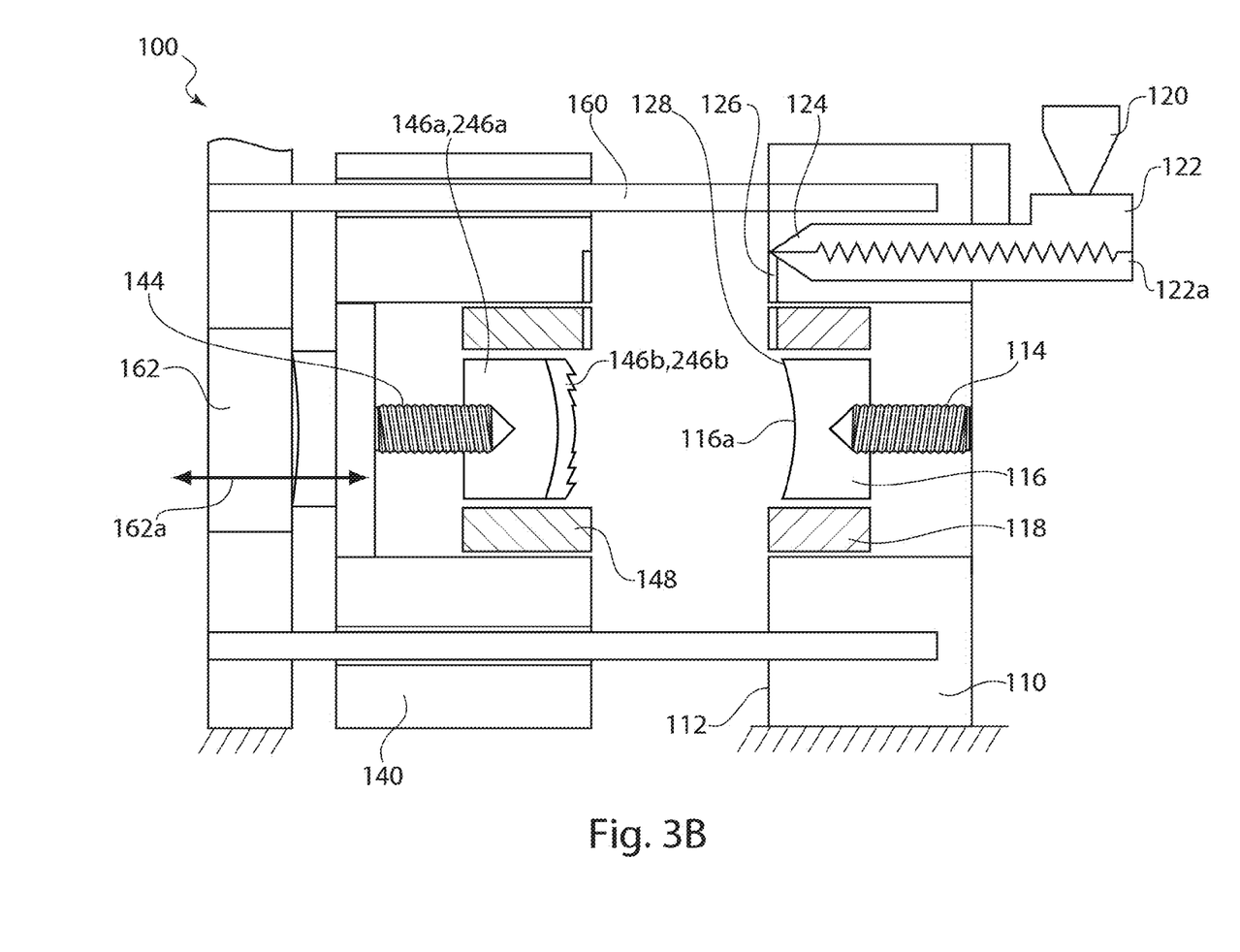
FIG. 3B is a diagram of an injection molding machine used in an embodiment according to the invention.

The hybrid mold insert and the plastic mold insert are inserted in a injection molding machine 100 as shown in FIG. 3B. The right side of the injection molding machine features a stationary platen 110 which supports a post 114 on to which a first mold insert 116 is mounted within a receiver 118. Receiver 118 is a ring that can be replaced with rings of varying inner diameter depending on what size lens diameter is to be produced. Post 114 can be adjusted to vary the distance of the mold surface to the mold parting line 112. Post 114 also allows the insert 116 to be exchanged with other inserts, for example inserts having different base curves.

Polymer pellets are stored in a hopper 120 where they feed into the barrel 122. Internally, barrel 122 includes a screw 122a which compresses the pellets. Externally, barrel 122 may be provided with heaters which heat the pellets. The compressed and heated pellets are rendered in to a molten resin and then injected by axial movement of the screw through a nozzle 124. The molten resin travels along a runner 126 to be delivered to the mold cavity. In the drawing, the runner is shown schematically by a section of the mold block 110 and receiver 118 having a channel formed in their surfaces adjacent the parting line. The channel extends from the nozzle to the cavity, and may have multiple legs to distribute molten resin from nozzle 124 to multiple cavities, for example 2 or 3 pairs of cavities. Injection molding takes solid thermoplastic resin, heats them above their glass transition temperature $T_g$, and injects the molten resin under high pressure into a mold cavity created between the movable and stationary platens.

Figure 2:
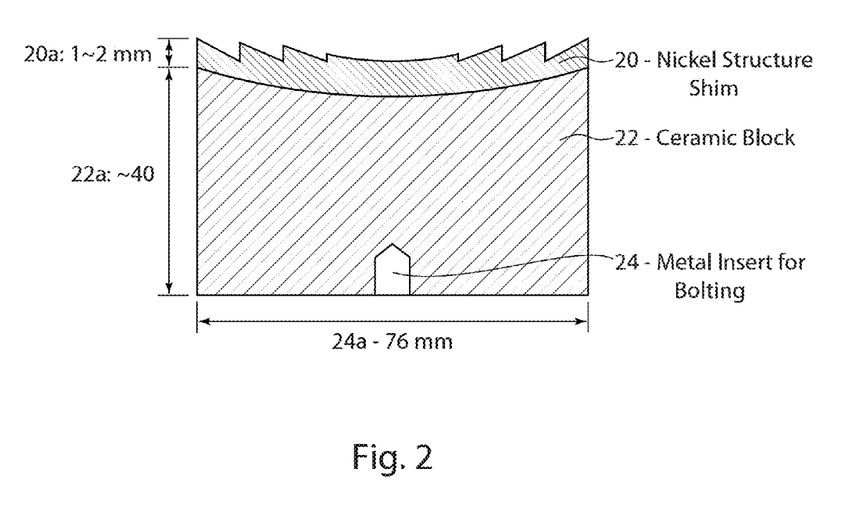
FIG. 2 is a diagram of an embodiment according to the invention of a hybrid mold insert.

A movable platen 140 is mounted on guide rails 160 for movement toward and away 162a from stationary platen 110. A clamp 162 moves the movable platen 140, for example with an electric or hydraulic drive capable of delivering 100 tons or more of clamping force. Similar to the stationary platen 110, the movable platen 140 includes a support post 144, a receiver 148 and a mold insert 146a. In one embodiment, mold insert 146a comprises a ceramic block, as shown in FIG. 2, which can be adjusted left or right with respect to the parting line by support post 144. A nickel structure shim 146b is permanently mounted on ceramic mold insert 146a. In an alternate embodiment, mold insert 146a is a metal insert with a structured plastic insert 146b removable installed on mold insert 146a.

Generally, the resin is injected adjacent the stationary side of the mold. The plastic insert is placed in the movable side of the mold. The mold cavity will then be formed between the plastic insert 146b and insert 116. As can be seen in illustration B of FIG. 3A, the plastic insert would be installed on the movable side of the mold.

The injection molding machine 100 is shown with the mold open at the beginning of the cycle. The nickel or plastic structured insert 146b has been placed with its corresponding installation method. When the mold is ready to close, clamp 162 is activated and movable platen 140 is translated to the right along guide rails 160 until it contacts stationary platen 110, meeting along parting line 112. As can be appreciated, when the mold is closed, an open channel defining runner 126 will be present between the closed mold blocks 110, 140. In addition, a gap will exist between mold inserts 116 and 146b, defining a mold cavity.

Molten resin will be delivered from nozzle 124 through runner 126 in to the mold cavity. The formed, closed mold cavity can most easily be seen in illustration C of FIG. 3A. The resin enters the mold cavity through a window called a gate. Lenses cannot be center gated because an imperfection is created at the gate. Center gating would place the imperfection in the center of the lens. As a result lens cavities are edge gated. The imperfection appearing at the edge gate 128 occurs in a waste zone that will be trimmed off when the lens is cut to fit a frame.

As described above, barrel 122 is provided with external heating units that control the temperature of the molten resin. This is referred to as the "melt temperature". The mold blocks 110 and 140 also contain heaters that control the temperature of the mold inserts. This is referred to as the "mold temperature." The mold block heaters may take the form of thermal control fluid being circulated through channels within the mold blocks. The channels pass near the receivers to control the temperature of the inserts. A thermolator is a device which maintains heated and cooled fluid. The thermolator can alternately circulate the heated or cooled fluid through the channels within the mold blocks. The process according to the invention avoids the need for a thermolator and the complexities accompanying same.

From a thermodynamic perspective, the cooler the mold temperature, the faster the molten resin will drop below its $T_g$, where it can be removed from the injection molding machine to complete the cycle. However, with a structured insert, the melt temperature and mold temperature have to be adjusted to allow the molten resin to completely fill the lens cavity before it begins to freeze off in a rounded tip, as shown in FIG. 1A. Premature freeze off, or solidification, will create a dam thereby preventing resin from reaching the corners of the microstructure. As these temperature are raised, the resin begins to deteriorate which causes lens defects, for example, in the form of yellowing or specks.

Figure 4:
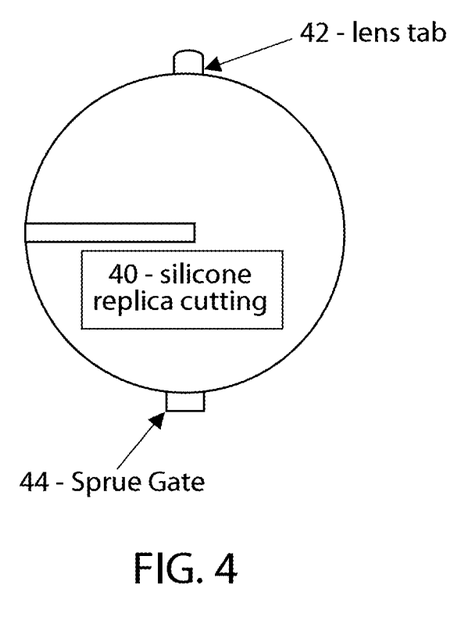
FIG. 4 is a diagram of a silicone replica cutting.

In order to check the microstructure replication quality, a silicone replica, was made on the molded Fresnel lens. They were cut at the same location, as shown in FIG. 4, to ensure there will be no effect coming from: 1) different thermal and stress history at different lens' location during injection molding; 2) microstructure inhomogeneity across insert. The cut piece was then put under microscope for observation and measurement. As can be seen in FIG. 4, a silicone replica cutting 40 is shown with a lens tab 42 and sprue gate 44. The sprue gate 44 corresponds to a small section of the runner that was formed in runner 126 (from FIG. 3B).

Experimental Results

The silicone replica was made on the Fresnel lens. It was cut as described in FIG. 4.

In one category, lenses were molded with hybrid and metal insert, at different mold temperatures and at the same melt temperature, 570° F. As we can see, for metal insert, all lenses show serious rounding, at tested mold temperatures. With increasing mold temperature, the rounding become less. However, even at 290° F., which is close to polycarbonate's $T_g$, the microstructure still couldn't be well replicated. For hybrid insert, less rounding was observed, compared to metal insert samples at same mold temperature. The rounding became less at higher mold temperatures. No rounding was observed at 280 and 290° F.

In another category, lens were molded at melt temperature of 590° F., for hybrid and metal insert, at mold temperatures from 260 to 280° F. For both inserts, the microstructure can be better replicated at same mold temperature. Increasing the mold temperature will help to reduce rounding. For hybrid insert, the microstructure can be fully replicated at mold temperature of 270 and 280° F. This indicated that microstructure can be well replicated at lower mold temperature, with higher melt temperature. This is because that higher temperature melt can flow easily into microstructure at lower mold temperature, before it solidify. For metal insert, the microstructure still can't be fully replicated, even at higher melt temperature.

The above observation concluded:

1) Hybrid insert can replicate microstructure with much higher fidelity than metal insert at same processing condition.

2) With higher mold temperature, the microstructure can be replicated with higher fidelity. Metal insert can't avoid teeth rounding at tested mold temperature; while hybrid insert can fully replicate microstructure at mold temperature of 280° F. (melt temperature at 570° F.).

3) Increasing the melt temperature can help replicate microstructure with better fidelity at lower mold temperature. However, it is still not sufficient for Nickel metal insert.

Plastic Insert

Two materials, Ethylene/Methacrylic acid (E/MAA) copolymer and thermoplastic Polyurethane (TPU) were molded with Polycarbonate (PC) and Cyclo Olefine Copolymer (COC) Fresnel lens, separately. Some material properties are listed in Table 4.

TABLE 4

Properties of raw materials tested in this Study

|  | PC | COC | E/MAA | TPU |
| --- | --- | --- | --- | --- |
| Grade | Lexan RL7220 | TOPAS ® 5013 | Surlyn 8150 | Texin DP7-3006 |
| Refractive Index | 1.59 | 1.53 | 1.50 | 1.50 |
| $T_g$ (° C./° F.) (DSC, 10° C./min) | 146/295 | 136/277 | −120/−184 | −46/−51 |

Example 1

E/MAA copolymer Fresnel Lens

The polycarbonate Fresnel lenses was used as the plastic insert. The polycarbonate Fresnel lens was made by injection-Embossing molding process. The lens replicated the microstructure from a nickel Fresnel insert with high fidelity.

Ethylene/methacrylic acid (E/MAA) copolymer was molded against this polycarbonate Fresnel lens by injection molding, following the procedures shown in FIG. 3A. The processing condition is listed in Table 5. The replication fidelity of microstructure was checked by microscopic pictures of the silicone replica of molded lens, at different location, i.e. edge, middle and center of lens.

Figure 5A:
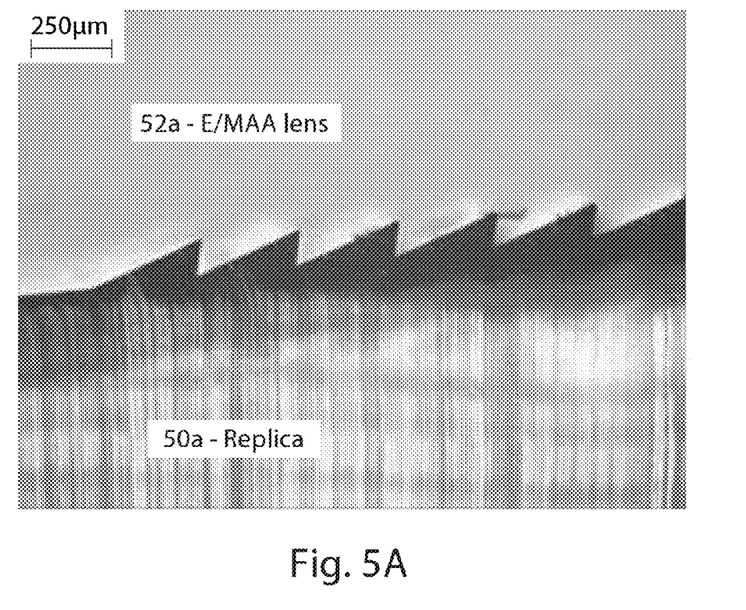
FIGS. 5A and 5B are micrographs of an E/MAA copolymer Fresnel lens.
Figure 5B:
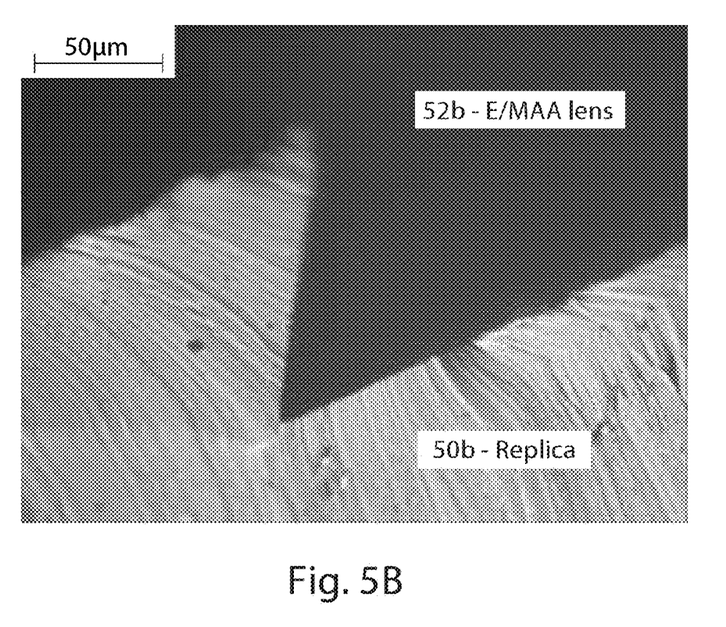

From representative micrographs, FIGS. 5A and 5B, we can see that E/MAA copolymer melt flowed into the bottom of the microstructure on the PC Fresnel lens, as demonstrated by the sharp feature of the microstructure tips on E/MAA lens. The sharpness of tips was observed at edge, center and location in between. FIG. 5A shows a micrograph of a replica 50a with the E/MAA lens 52a at a first magnification with about 5 ridges. FIG. 5B shows a further micrograph of the replica 50b with the E/MAA lens 52b at a second magnification with 1 ridge. These pictures confirmed that microstructures on plastic insert could be replicated with high fidelity.

TABLE 5

Processing condition for E/MAA copolymer
Parameters

| Melt Temperature (° F.) | 400 |
| --- | --- |
| Injection Speed (mm/s) | 25 |
| Holding Pressure (bar) | Multi steps from 1000 to 700 bar |
| Holding Time (s) | 8 |
| Cooling Time (s) | 150 |
| Mold Temperature (° F.) | 96 |

Example 2

TPU Fresnel Lens

Since TPU has a very strong adhesion with PC, the COC Fresnel lens was used as the plastic insert. TPU was molded against COC Fresnel lens by injection molding, following the procedures shown in FIG. 3. The processing conditions are listed in Table 6.

TABLE 6

Processing conditions for TPU over COC
Parameters

| Injection speed (mm/s) | 11 |
| --- | --- |
| Injection pressure (bar) | 700 |
| Switch over (mm) | 7.5 |
| Holding Pressure (bar) | Multi steps from 500 to 75 bar |
| Holding Time (s) | 3 |
| Barrel Temperature (F.) | 365 |
| Cooling time (s) | 150 |
| Mold Temperature (F.) | 127 |

The replication fidelity of the microstructure was checked by microscopic pictures of the molded lens, at different locations. We can see that TPU lens had replicated its microstructure on the COC Fresnel lens with high fidelity.

The above description has demonstrated that plastic inserts can be used in an industrial process to injection mold Fresnel lenses of good quality. The final goal is to manufacture a polycarbonate Fresnel lens, and then coat the Fresnel structure by an overlayer to protect the Fresnel structure and increase the power of the lens. The power of the final lens can be controlled by adjusting the refractive index of polycarbonate Fresnel lens relative to the refractive index of the "coating" material. The final purpose of this concept is to provide a thinner and thicker PC lens, that is, a PC lens of variable thickness containing a Fresnel structure.

In the above description a plastic mold insert was used to injection mold a Fresnel lens. The thus obtained plastic Fresnel lens, could then serve as further mold insert in a second stage to injection mold a coating. Indeed, in the coating stage, we have the same problem of controlling the heat conductivity between the Fresnel lens and the material used for the coating. The issue is similar to ensure that the coating material obtains sufficient flowability to completely fill inside each pitch of the Fresnel structure. The main difference compared to the plastic insert as described hereinbefore, is that in the present case we need to use as the coating a material that is able to "adhere" strongly to the fresnel structure; to guarantee no delamination during the life of the product.

Following these guidelines, another thermoplastic polymer will be injection molded directly over the structured surface to protect a Fresnel polycarbonate (PC) lens. The coating layer will be intimately bonded to the Fresnel PC lens to form a permanently integrated product, that is, an ophthalmic lens. The Fresnel lens will be placed in the mold at the beginning of the cycle with the structured surface facing the cavity, and another thermoplastic polymer will be injection molded to surround and protect the structured surface.

In practical applications, such a coated Fresnel lens demonstrated the following advantages.

1. The thermoplastic polymer sufficiently filled the Fresnel microstructure, without any air gap between it and the Fresnel PC lens. On the other hand, the microstructures on the Fresnel PC lens are well preserved without any rounding or deformation occurring during injection molding.

2. The overall cosmetic aspect of the coated Fresnel PC lens is very good. No ghost image, or distorted image was observed. The haze level and the light transmission rate are improved.

In the practical applications, the coated Fresnel lens demonstrated the following disadvantages.

1. The range of optical thermoplastic polymer available to achieve desired performance is limited due to the following criteria:

1.1 For better optical power, the refractive index of thermoplastic polymer should be different from that of polycarbonate, which is used to form Fresnel lens. The larger the difference, the higher the optical power of the final integrated lens.

1.2 The thermoplastic polymer should have strong adhesion with polycarbonate. Otherwise, delamination will occur between the interface of the polycarbonate microstructure and the thermoplastic polymer coating.

Figure 6:
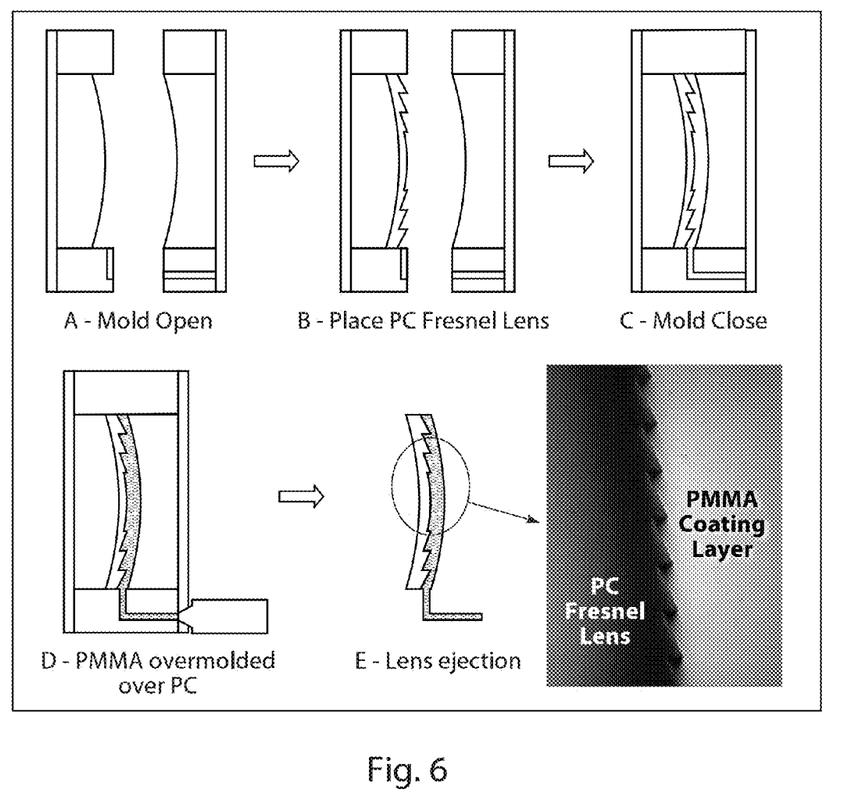
FIG. 6 is a diagram showing various steps of a thermoplastic coating process according to an embodiment of the invention.

The objective of this process is to apply a thin thermoplastic coating on top of the Fresnel PC lens in which the Fresnel microstructure is close to the front surface. The detailed processing procedure is schematically shown in FIG. 6, which includes the following steps:

A. The mold opens to begin the cycle.

B. After mold opens, a Fresnel PC lens is placed in the mold cavity, with structured surface facing the cavity. The Fresnel lens is placed on the movable side 140 of the mold (as shown in FIG. 3B) appearing as lens 246b. Lens 246b is placed on a metal insert 246a.

C. The mold closes.

D. After mold closes, a thermoplastic polymer, such as Poly(methyl methacrylate) (PMMA), is then injection molded over the Fresnel PC lens. To have a high level of replication, it is necessary that the heat conductivity of the injected thermoplastic polymer is lower than the heat conductivity of the Fresnel lens itself.

E. After being packed and cooled for certain time, the integrated PMMA/Fresnel PC lens is ejected.

Four different materials, which are optically transparent and have a lower refractive index than PC, were chosen as the coating material. These were cyclo olefin copolymer (COC), poly(methyl methacrylate) (PMMA), ethylene/methacrylic acid (E/MAA) copolymer and thermoplastic urethane (TPU). Table 7 shows some properties of these materials.

TABLE 7

Properties of Raw Materials Tested in This Study

|  | PC | COC | E/MAA | PMMA | TPU |
|---|---|---|---|---|---|
| Grade | Lexan RL7220 | TOPAS ® 5013 | Surlyn 8150 | ACRYLITE M30 | Texin DP7-3006 |
| Refractive Index | 1.59 | 1.53 | 1.50 | 1.49 | 1.50 |
| $T_g$ (° C./° F.) (DSC, 10° C./min) | 146/295 | 136/277 | −120/−184 | 86/187 | −46/−51 |

3. Compared to monomer casting, thermoplastic has the following advantage:

3.1 Thermoplastic coating has lower shrinkage, since it directly utilizes the thermoplastic polymer. While monomer casting normally causes 10% or more shrinkage, Because shrinkage is known to cause some undulation of the coated surface, i.e. the Fresnel microstructure in this instance, the optical quality is diminished.

3.2 With proper molding process design, such as a two-shot injection molding, thermoplastic polymer could be injection molded right after the Fresnel PC lens is molded. Compared to monomer casting, this can greatly reduce the production steps and time.

As tested, COC and E/MAA copolymer didn't adhere to the polycarbonate Fresnal lens. The overmolded layer could be easily delaminated from the Fresnel PC lens. However, PMMA and TPU showed a strong adhesion with PC, which might be due to their chemical affinity, or polarity match with PC. Both PMMA and TPU have ester group along their main chain, which also exists in the PC main chain. COC and E/MAA copolymer are polyolefin based materials. Although the E/MAA copolymer has ester group, its content might be too low.

The molecular structures of these thermoplastic materials that were tested are shown below, Molecular diagram (I) shows polycarbonate (PC).

PC

Molecular diagram (II) shows PMMA

PMMA

Molecular diagram (III) shows E/MAA.

E/MAA

Molecular diagram (IV) shows a thermoplastic polyurethane (TPU).

TPU

Molecular diagram (V) shows a cyclo olefin copolymer (COC). The radical may be Hydrogen (H) or a hydrocarbon of the formula CxHy.

COC
R = H; CxHy

In the following, detailed processing conditions and results are listed for both PMMA and TPU.

Example 1

PMMA Overmolded onto Fresnel PC Lens

The typical processing conditions is listed in Table 8. Two parameters, melt temperature and mold temperature, were tested systematically (Table 9), to see their effects on microstructure filling, rounding and deformation.

TABLE 8

General processing condition for PMMA

| Parameters | |
|---|---|
| Melt Temperature (° F.) | 460 |
| Injection Speed (mm/s) | 25 |
| Holding Pressure (bar) | Multi steps from 1000 to 150 bar |
| Holding Time (s) | 9 |
| Cooling Time (s) | 220 |
| Mold Temperature (° F.) | 131 |

TABLE 9

Test matrix for melt temperature and mold temperature

| | | Melt Temperature (° F.) | | | | | | |
|---|---|---|---|---|---|---|---|---|
| | | 470 | 460 | 450 | 440 | 430 | 420 | 410 |
| Mold Temperature (° F.) | 111 | x | | x | | x | | x |
| | 131 | | x | x | x | x | x | x |
| | 151 | x | | x | | x | | x | x represents conditions being tested.

1.1 Melt Temperature Effect

The melt temperature should be set above 400° F. Otherwise, delamination will occur.

The microstructures were filled quite well, at all tested temperatures (410 to 470° F.).

The microstructure tips were rounded at edge location of Fresnel PC lens at all tested melt temperatures. However, at middle and center location, much less and no rounding was observed.

The melt temperature should be set below 500° F. Otherwise, serious rounding will happen to microstructure tips.

1.2 Mold Temperature Effect

The mold temperature was tested at 111, 131 and 151° F. No effect on rounding and filling of microstructure was observed. However, with increasing mold temperature, the microstructure is more likely deformed at edge position. There was no such effect observed at middle location of an overmolded Fresnel lens.

1.3 Holding Pressure Effect

Holding pressure effect was tested at different holding pressure, 700, 800, 900 and 1000 bar. No effect was observed on microstructure deformation and filling.

1.4 Microscopic Pictures of Integrated PMMA/Fresnel PC Lens

Figure 7A:
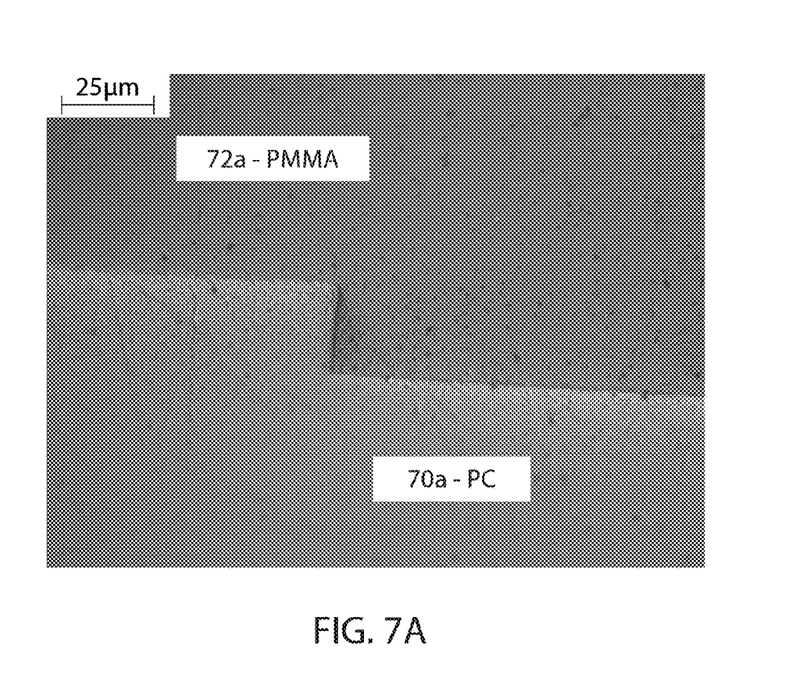
FIGS. 7A and 7B are micrographs of a PC Fresnel lens and PMMA coating.
Figure 7B:
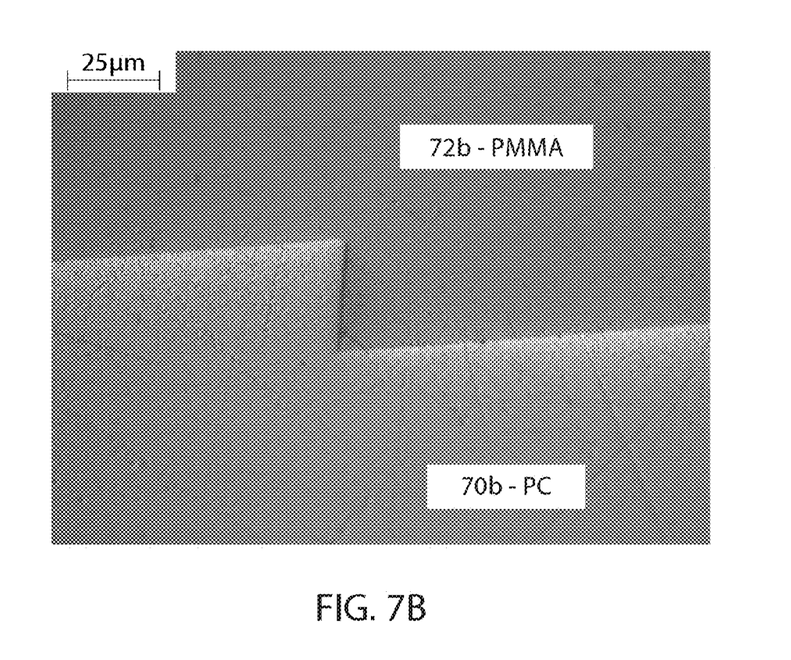

The detailed microscopic pictures of cross-section of Fresnel PC lens with PMMA coating is shown in FIGS. 7A and 7B, for Fresnel teeth at different locations. The teeth are numbered from the center to the edge of lens. FIG. 7A shows the $1^{st}$ PC Fresnel tooth 70a and the adjacent PMMA coating 72a. FIG. 7B shows the 18 11 PC Fresnel tooth 72b and the adjacent PMMA coating 72b. As we can see, (1) The microstructure on polycarbonate Fresnel lens is well filled. No air gap is observed at the bottom of microstructure on polycarbonate Fresnel lens. (2) No rounding of tips of microstructure of polycarbonate Fresnel lens is observed, for $1^{st}$, $18^{th}$ and $27^{th}$ tooth. Only last tooth at edge show some rounding. (3) The shape of teeth is well maintained, no deformation is observed.

The overall cosmetic aspect of coated Fresnel PC lens is very good. No ghost image, or distorted image was observed.

No air bubble was observed. The haze level and the light transmission rate were improved compared with uncoated Fresnel PC lens.

Example 2

TPU Overmolded onto PC Fresnel Lens

The typical processing condition is listed in Table 10.

TABLE 10

| Typical processing condition for TPU overmolding | |
|---|---|
| Parameter | |
| Injection speed (mm/s) | 10 |
| Injection pressure (bar) | 900 |
| Switch over (mm) | 7.5 |
| Holding Pressure (bar) | Multi steps from 700 to 100 bar |
| Holding Time (s) | 3 |
| Barrel Temperature (° F.) | 360 |
| Mold Temperature (° F.) | 150 |
| Dosage (mm) | 30 |
| Cooling time (s) | 150 |

Figure 8A:
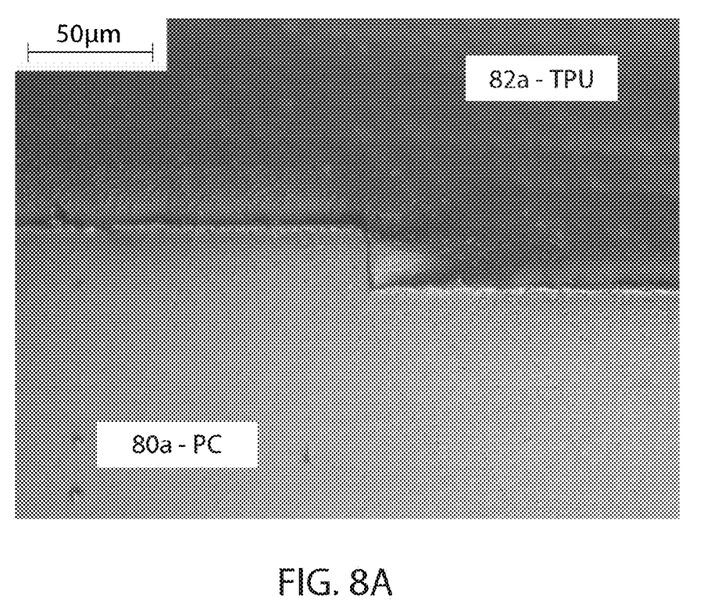
FIGS. 8A and 8B are micrographs of a PC Fresnel lens and TPU coating.
Figure 8B:
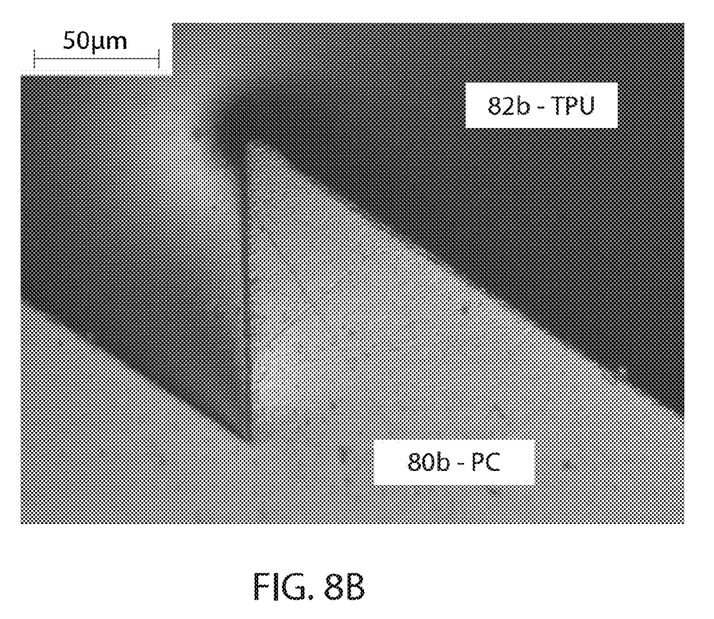

The microscopic pictures of cross section of integrated TPU/Fresnel PC lens are shown in FIGS. 8A and 8B, for Fresnel teeth at different locations. FIG. 8A shows the $1^{st}$ PC tooth 80a at the center of the lens with the adjacent TPU coating 82a. FIG. 8B shows the last PC tooth 80b at the edge of the lens with the adjacent TPU coating 82b. Same results are found as for PMMA/PC lens: (1) The microstructures on Fresnel lens are well filled. (2) No rounding of microstructure teeth. (3) No deformation of microstructure teeth.

The overall cosmetic aspect of coated Fresnel PC lens is good. No ghost image, or distorted image was observed. No air bubble was observed.

In summary, the processes and described utilize low heat conductivity to prevent heat dissipation during molding of the Fresnel structure and the coating to improve material flow. A thermolator which provides a heat-cool cycle was not needed. The complexities and long cycle times of the injection-embossing molding process are avoided. The process provides significant advantages such as low shrinkage, lack of air bubbles between the microstructure and the coating, lack of voids between the microstructure and the coating, and a relatively short cycle time in a streamlined industrial process.

One embodiment of the process includes manufacturing the Fresnel structure and coating in two steps using a conventional injection molding machines. It is also possible to manufacture, for example a PC Fresnel lens with a thin PMMA coating layer, in a multi-stage molding process by using the device and process described to WO2005/042225. This process is dedicated to the manufacture of bi-composite thermoplastic ophthalmic lens. The process would be modified using the materials and process control setting described herein.

Having described preferred embodiments for manufacturing lenses containing a Fresnel structure and the resulting ophthalmic lenses (which are intended to be illustrative and not limiting), it is noted that modifications and variations can be made by persons skilled in the art in light of the above teachings. For example, in the first stage injection molding of the Fresnel structure, other mold inserts could be used which provide equivalent heat conductivity control and which result in good mold replication. In the second coating stage other materials could be used which provide differentiated refractive indices from the Fresnel structure and which protect and adhere to the Fresnel structure. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A process to manufacture an ophthalmic lens containing a Fresnel surface inside the ophthalmic lens, the process comprising the steps of:
   injection molding by injecting a first thermoplastic material in a mold comprising a microstructured mold insert to provide a first microstructured form having a Fresnel surface,
   the microstructured mold insert having a heat conductivity that is lower than the heat conductivity of the first thermoplastic material to delay heat dissipation of the first thermoplastic material and allow the first thermoplastic material to flow therethrough,
   a temperature of the microstructured mold insert being lower than the first thermoplastic material's glass transition temperature upon injecting the first thermoplastic material in the mold,
   the microstructured mold insert being demoldable from the first microstructured form; and
   overmolding a second thermoplastic material onto the Fresnel surface of the first microstructured form to provide the ophthalmic lens, the second thermoplastic material being different from the first thermoplastic material.

2. The process of claim 1, wherein said microstructured mold insert forms part of an edge-gated lens cavity.

3. The process of claim 1, wherein the microstructured mold insert is a hybrid mold insert comprising a nickel microstructured shim bonded to a ceramic pillar.

4. The process of claim 1, wherein the microstructured mold insert is a plastic, the microstructured mold insert removably mounted on a support pillar, wherein the plastic is a third thermoplastic material which avoids adherence to the first thermoplastic material.

5. The process of claim 1, wherein the second thermoplastic material has a heat conductivity that is lower than the heat conductivity of the first thermoplastic material.

6. The process of claim 5, wherein the second thermoplastic material demonstrates strong adhesion to the first thermoplastic material.

7. The process of claim 1, wherein said overmolding step includes placing the first micro structured form in to an injection molding machine and overmolding the second thermoplastic material to provide an intimate bond with the first microstructured form and the second thermoplastic material.

8. The process of claim 1, wherein the ophthalmic lens comprises a first thermoplastic material with a first refractive index and a second thermoplastic material having a second refractive index different from the first refractive index.

9. The process of claim 1, wherein the first thermoplastic material comprises polycarbonate.

10. The process of claim 9, wherein the second thermoplastic material is a poly(methyl methacrylate).

11. The process of claim 1, wherein the first thermoplastic material and the second thermoplastic material are different.

12. The process of claim 4, wherein the first thermoplastic material and the third thermoplastic material are different.

13. The process of claim 9, wherein the second thermoplastic material is a thermoplastic urethane.

14. The process of claim 1, wherein the micro structured mold insert comprises two materials forming two layers bonded together, in which a low thermal conductivity of a first layer of the microstructured mold insert lowers the overall thermal conductivity of the micro structured mold insert.

15. The process of claim 14, wherein a second layer of the microstructured mold insert is significantly thinner than the first layer.

16. The process of claim 1, wherein the first thermoplastic material comprises a soft material having a glass transition temperature below room temperature.

17. The process of claim 1, wherein the injection molding operates such that the first thermoplastic material is molded at a mold temperature below the glass transition temperature of the first thermoplastic material.

18. The process of claim 1, wherein the process is performed without a thermolator.

19. The process of claim 1, wherein a temperature for melting the first thermoplastic resin is at or greater than a melt temperature of the first thermoplastic resin.

20. The process of claim 1, wherein the temperature of the microstructured mold insert is near the first thermoplastic material's glass transition temperature upon injecting the first thermoplastic material in the mold.

* * * * *